O. W. OLMSTED.
COMBINED TYPE WRITING AND COMPUTING MACHINE.
APPLICATION FILED FEB. 16, 1912.

1,278,497.

Patented Sept. 10, 1918.
4 SHEETS—SHEET 1.

O. W. OLMSTED.
COMBINED TYPE WRITING AND COMPUTING MACHINE.
APPLICATION FILED FEB. 16, 1912.

1,278,497.

Patented Sept. 10, 1918.
4 SHEETS—SHEET 2.

O. W. OLMSTED.
COMBINED TYPE WRITING AND COMPUTING MACHINE.
APPLICATION FILED FEB. 16, 1912.

1,278,497.

Patented Sept. 10, 1918.
4 SHEETS—SHEET 4.

FIG. 10.

UNITED STATES PATENT OFFICE.

OSMOND W. OLMSTED, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,278,497.

Specification of Letters Patent.

Patented Sept. 10, 1918.

Application filed February 16, 1912. Serial No. 677,974.

*To all whom it may concern:*

Be it known that I, OSMOND W. OLMSTED, a citizen of the United States, residing in Hartford, in the county of Hartford and State of Connecticut, have invented certain new and useful Improvements in Combined Type-Writing and Computing Machines, of which the following is a specification.

This invention relates to a new and improved column selecting mechanism for computing machines useful in such types as the Underwood-Hanson combined typewriting and computing machine, and is an improvement on the application of Frederick A. Hart, No. 466,836, filed December 10, 1908.

In the Underwood-Hanson machine it has been common in the past to control the selection of the particular computing wheel in a computing head which is to run up a number struck by one of the numeral keys of the computing mechanism, so that the computing wheel selected will agree, in its position, relative to the other computing wheels, with the denominational column in which the particular number is printed on the work sheet on the carriage, by causing the position of the carriage to determine the picking up from its fellows, of the particular bar of a series, which actuates the computing wheel corresponding to the denominational column being printed.

This has been accomplished by providing one or more tappets on the carriage which, on the successive step-by-step movements of the carriage, forced up one by one each of a series of jacks, which in turn, through associated linkages, raised the corresponding pin bars connected to rotate the accordant computing wheels variable amounts according to which particular one of a series of pins on each bar is depressed by a valuating mechanism controlled from the numeral keys.

While the above system has its advantages, it is desired to present in this application another way of doing the same thing, so that the carriage spring will only have to actuate the carriage itself and its appurtenances.

It is therefore an object of this invention, while still depending on the carriage by its position to select the computing wheel ac- cordant with the denominational column being written in, to impose the actual work of the selection after it has been indicated by the carriage, on some other part of the mechanism.

A further object of this invention is to impose on the numeral keys the actual work of shifting the computing-wheel-selecting mechanism as determined by the tappet carried by the carriage.

Another feature of this invention is to provide means for rendering the mechanism which actuates the jacks and pin bars ineffective, when the platen frame is shifted to write upper case characters, by disconnecting this mechanism from the numeral keys.

A further feature of this invention is to enable the manual disconnection at will of the mechanism for lifting the jacks and pin bars from the numeral keys, so as to permit the actuation of the numeral keys in plain type-writing without operating any of the associated computing mechanism.

A still further feature of this invention is to provide new and improved means enabling the control of the comma and period locks which prevent the actuation of numeral keys at points where commas and periods should be struck.

In the exemplification used to show the above objects, features and further features, the carriage is provided with one or more tappets, according to the number of computing zones desired, which are adjustable to any position relative to the carriage to control the computing zones, and are normally out of contact and connection with the series of jacks for each computing head. Each tappet, however, is movable, when in register with any one of the jacks, to lift the same by mechanism operable by any and all of the numeral keys on being struck. This mechanism is shown to embody a linkage camming at one point against the tappets to raise the same when in a computing zone, and connected at another point to all the numeral keys so as to be operated thereby with a lost motion connection, however, so that while the operation of any one of the numeral keys will actuate the linkage, it will not disturb the other numeral keys. The linkage is breakable either manually or by the shifting of the platen frame to write upper case characters, at a point common to all the numeral keys, so as to render the operative actuation of the linkage by the numeral keys impossible to effect the setting up of a computation.

Provision is further made at points corresponding to the comma and period columns on the work sheet to hold the tappet in its raised position after having been forced up in this position in the previous denominational columns, so as to actuate the associated jacks which bring in play locking mechanism preventing the numeral keys from being effectively struck at these points, thus preventing an error and indicating to the typist that a comma or period should be struck.

Other features and advantages will hereinafter appear.

In the accompanying drawings.

Referring more particularly to the separate parts of this invention as embodied in the form shown in the drawings, 1 indicates numeral keys and 2 character keys which are secured to key levers 3 and actuate type bars 4, through the intermediary of bell cranks 5, to swing said type bars against the front side of a platen 6 mounted to rotate on a carriage 7. The carriage 7 is moved step-by-step at the actuation of each of the keys in the usual manner by means of a spring barrel 8 and under the control of an escapement mechanism indicated in general at 9. The carriage 7 itself is mounted to run on rails 10, and is provided with an inner carriage or platen frame 11, which supports the platen 6 in a movable manner so that said platen can be moved bodily to change from lower to upper case characters. The platen frame 11 may be supported in any suitable manner on the main carriage 7 as by being pivotally hung thereon by means of arms 12.

The inner carriage or platen frame 11 is also supported by one or more rollers 13 which rest on a shift rail 14 carried by a shifting frame 15 pivotally mounted at 16 on the frame of the machine. The shifting frame 15 is swung by one or more shift keys 17, which are each provided with an arm 18 engaging the back side of the frame 15. It will be readily seen by this mechanism that the platen frame 11 can be raised either temporarily or semi-permanently to cause a change from lower to upper case characters.

When it is desired to compute as well as typewrite, the numeral keys 1 actuate a valuating mechanism, indicated in general at 19, of a computing mechanism 20, each being provided with a plunger 21 which operates to spread apart parallel connected links 22 and 23 of the valuating mechanism, as is common in the Hanson type of computing machine, and as is described in the application of Frederick A. Hart, No. 466,836 and patent to Hart No. 1,190,171 dated July 4, 1916. The lower bar 23 of the particular elements of the valuating mechanism 19 operated by the associated numeral key 1, will depress one of a series of indexing devices or pins 24 on the particular one of a series of bars 25 which happens to be raised above its fellows at this instant. There is one of these bars 25 for each of a series of computing wheels 26, which in the aggregate form a computing head. There may be one or more computing heads according to the character and number of computations which it is desired to carry out. The bars 25 may actuate the computing wheels in any suitable manner as by each being provided with a rack 27 which engages a pinion 28 carried by each of the computing wheels 26. The bars 25 may be called column bars in view of the fact that they and their associated computing wheels 26 correspond to some particular denominational column being written on the work sheet on the platen 6.

Inasmuch as the computing wheels 26 must be actuated in accordance with some particular denominational column on the work sheet on the platen 6, it is found convenient to control the selection of the particular computing wheel to be actuated at any particular instant from the carriage by the position of the carriage. For this purpose there is adjustably mounted on a rod 29, carried by the carriage 7, one or more tappets 30 depending on the number of computations or computing zones desired in a single line of writing. The tappet 30, during the step-by-step movement of the carriage 7, will come successively into register with each one of a series of jacks 31 pivotally mounted intermediate their ends on a stationary portion of the frame of the machine. It will be noted in passing, however, that the tappets 30 do not actually come in contact with the jacks 31 during the movement of the carriage 7 of their own accord, but are normally located below and out of reach of the jacks 31, so that if desired the tappets 30 can pass freely beneath the jacks 31 without operating the same either in a forward or return movement of the carriage 7.

The jacks 31, when actuated, however, are raised at their forward ends and depressed at their rearward ends, so as to push on the associated one of a series of thrust links 32 connected at their lower ends to associated linkages 33 which are adapted to raise the accordant pin bars 25. It may be pointed out that the linkages 33 are of a reversing or transposing nature so that the jack 31 at the extreme left hand end of the series will actuate the pin bar 25 at the extreme right hand end of the series, and vice versa, with the intermediate jacks and pin bars associated in reverse order. Not all of the jacks in the series, however, are used to lift the pin bars, but certain of these, indicated at 34, operate thrust links 35 to swing levers 36, whereby a locking mechanism (not shown specifically herein but shown in said Hart application and patent) is actuated through the intermediary of links 37 to prevent the complete actuation of the numeral keys 1 when one of the tappets 30 happens to be in register with one of the jacks 34 corresponding to a denominational column on the work sheet on the carriage in which a comma or period should be struck; as between decimal and units, between hundreds and thousands, and thousands and millions.

The indexing devices or pins 24, when set up on the bars 25, determine the extent of movement of said bars, and thus the extent of rotation of the computing wheels 26. The bars are actuated by a general operator 38 which has a cross bar 39 adapted to engage all of the depressed pins during its forward movement. The bars 25 are returned by a cross bar 40 engaging a lug 41 provided on each bar in the manner as described in the above mentioned Hart application and patent. The general operator 38 may be of any suitable character, and may be provided with a rack 42 which engages a pinion 43 meshing with a segment gear 44 operated by any suitable means such as a hand crank 45.

As has been stated above, the tappet or tappets 30 are not capable in themselves to actuate the jacks 31, and are more in the nature of passive means for selecting or indicating the particular one of the jacks to be actuated at any particular instant. We now come, therefore, to the means for applying the necessary force to actuate the jacks 31 to complete the selection of a particular pin bar 25 to be raised, and thus the selection of a particular computing wheel 26 to be actuated to accumulate the number struck by a certain one of the numeral keys at a certain instant. The tappets 30 are both slidingly and pivotally mounted on the rod 29, so that they can be adjusted longitudinally thereof to any position relative to the carriage 7, so as to change the zone of computing. These tappets 30 are each provided with a downwardly extending lug 46, which, when in its lower position, will engage any one of the grooves formed between teeth on a rack bar 47 which determines the position of the tappet 30 relative to the carriage 7. This connection, however, while preventing movement of the tappets 30 longitudinally of the rod 29, does not prevent a swinging or oscillating movement of these tappets.

In order to obtain the oscillating or swinging movement of the tappet 30 to raise the jacks 31, there is provided a bar 48 extending beneath all of the jacks 31 and 34, so as to come in contact with a cam surface 49 on the lug 46 of the tappet 30, whereby the tappet will be forced up into engagement with the jack 31, and also far enough to tilt the jack about its pivot the required amount to properly raise the associated bar 25.

The bar 48, which may be termed a universal bar in that it is common to all of the jacks 31 and 34, is supported by a pair of arms 50 secured to a rock shaft 51. These arms may be provided with oppositely facing cams 52 which will enable the tappet 46 to ride over the arms 50 to come in contact with the bar 48 when the carriage is moving in either direction. Also secured to the rock shaft 51 is an arm 53 which is used to rock the shaft 51, and forms, with said shaft, the arms 50 and the universal bar 48, what might be termed a "universal shifter or actuator" for manipulating the jacks 31 through the intermediary of the tappet 30 which forms a selecting or determining interponent.

The arm 53 is connected by a pin-and-slot connection 54 to a connecting link 55, which is detachably connected at its front end to an arm 56 of a universal bell crank 57. The universal bell crank 57 is provided with arms 58 individual to each of the numeral keys "1" to "9," and connected thereto by means of links 59. It will be noted that between the universal bell crank 57 and each of the numeral keys 1 there is provided a lost motion connection, so that when one of the numeral keys actuates the bell crank, the others of the numeral keys will not in turn be depressed by said bell crank. This is shown to consist in pin-and-slot connections 60 between the arms 58 and the links 59. From this arrangement, it will be seen that the actual work necessary to raise the jacks 31 and actuate the connected mechanism, that is to say, lift the associated bars 25, is imposed on the numeral keys 1, so that they not only determine the extent of rotation of the computing wheels 26 by actuating the proper elements of the valuating mechanism 19, but that they also complete the selection of the proper bars 25 and associated computing wheels by raising the tappet 30 and the jacks 31.

Inasmuch as when the platen 6 and its frame are raised to write upper case characters by an actuation of one of the shift keys 17, it will not be desirable to have the jacks 31 and the associated mechanism actuated at this time, because of the fact that numerals would not be struck on the work sheet on the platen at this time. There is therefore provided means whereby the connection between the numeral keys 1 and the tappet 30 can be interrupted, which means can be controlled by the shifting of the platen to write upper case characters. This is accomplished by providing the connection between the universal shifter and the numeral keys 1, which may be termed with the shifter a "linkage," with a disconnecting or breaking point, whereby the numeral keys may be operatively disconnected from the universal shifter. For this purpose, the connecting link 55 is provided at its forward end with a hook 61 loosely engaging a pin 62 provided on the arm 56 in such a manner that while the hook is in engagement with the pin, the movement of the numeral keys will be positively transmitted to the tappet 30, but also so that the hook can be readily lifted from the pin to interrupt the connection.

The pin 62 may be in the nature of a set screw, as shown, engaging a slot in the arm 56 so that its position relative to the arm can be changed to obtain a nicety of adjustment. The means for lifting the hook 61 out of engagement with the pin 62 is shown to consist in a disconnector 63 secured to the shift rail 14, so as to raise the link 55 when the platen frame and its platen are raised to their upper case writing position. The disconnector is shown to include a plate 64 secured to the shift rail 14 and depending therefrom in juxtaposition to the link 55. Adjustably mounted on the plate 64, by means of one or more pin-and-slot connections 65, there is provided an adjustable guide 66 having a guiding ear 67 formed by spaced ears 68 and 69 for supporting and guiding the movement of the connecting link 55. The guide 66 is preferably made of spring metal and provided with a handle 70, so that it can be manually adjusted relatively to the plate 64, and when once adjusted will positively hold its position until actually forced by manual adjustment to a different position.

Figures 1, 2:
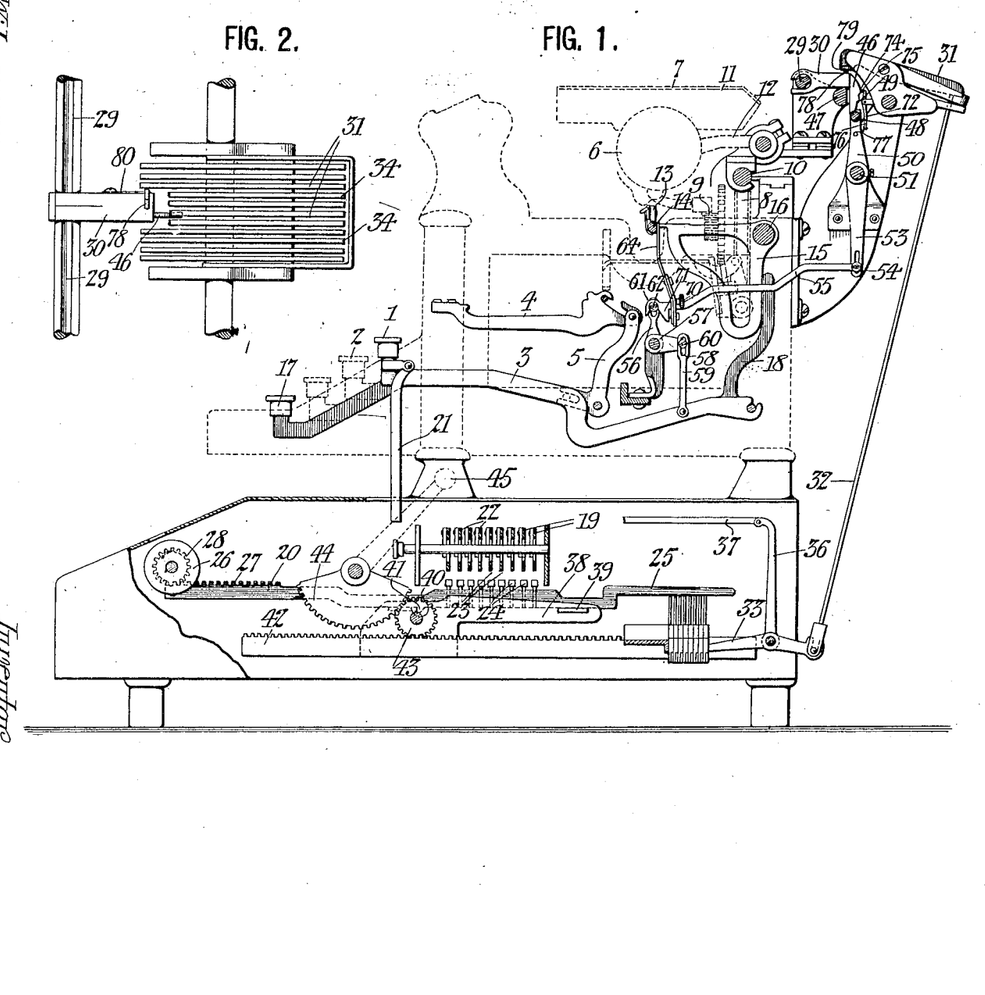
Figure 1 is a view in side elevation partly in section and partly broken away to show the underlying structure.
Fig. 2 is a fragmentary top plan view partly broken away to show the underlying structure, and disclosing the relative arrangement of one of the tappets with one of the sets of jacks.
Figures 3, 4:
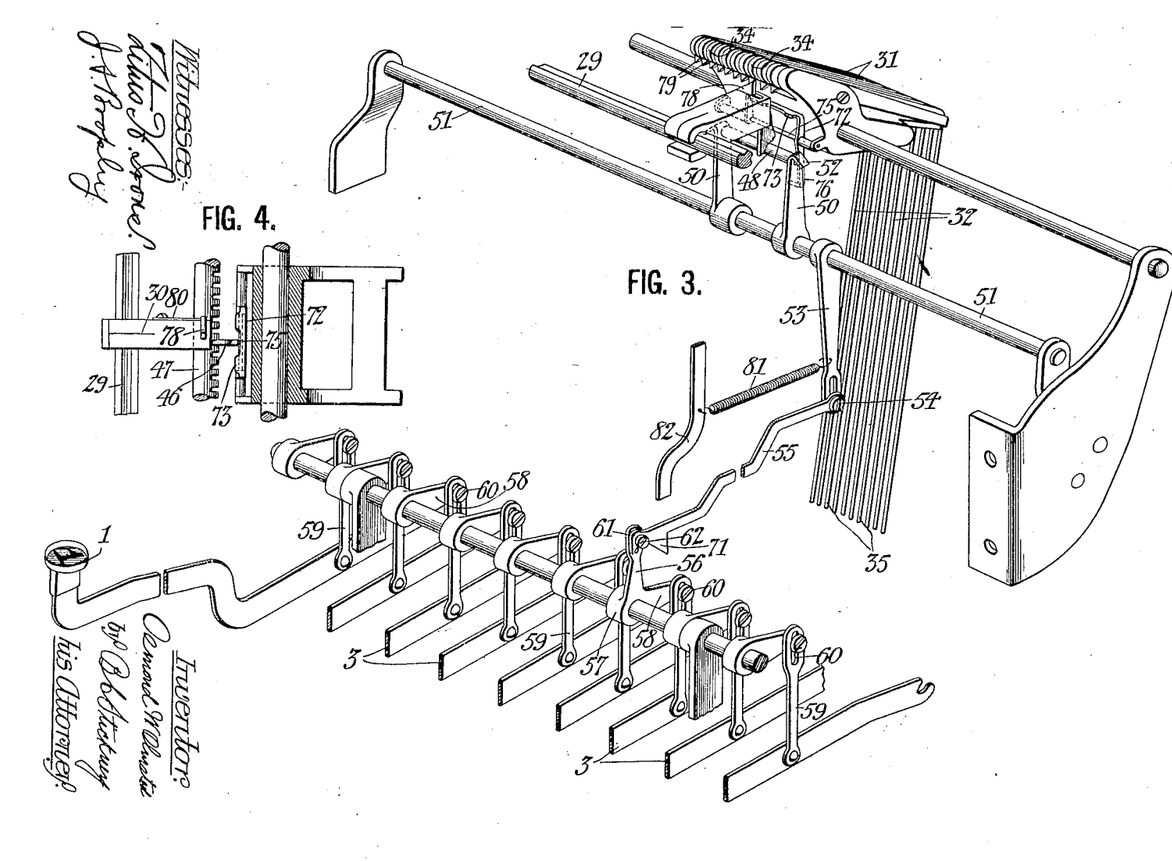
Fig. 3 is a fragmentary skeleton perspective view, showing the connection of the numeral keys with the tappet and the means for operating the same.
Fig. 4 is a fragmentary horizontal section, showing the relative arrangement of one of the tappets with the selecting detent, and showing a relative position in which the lug of the tappet is out of register with the ears for holding the tappet in its raised position when a comma or period jack is to be actuated.
Figures 5, 6, 7, 8, 9:
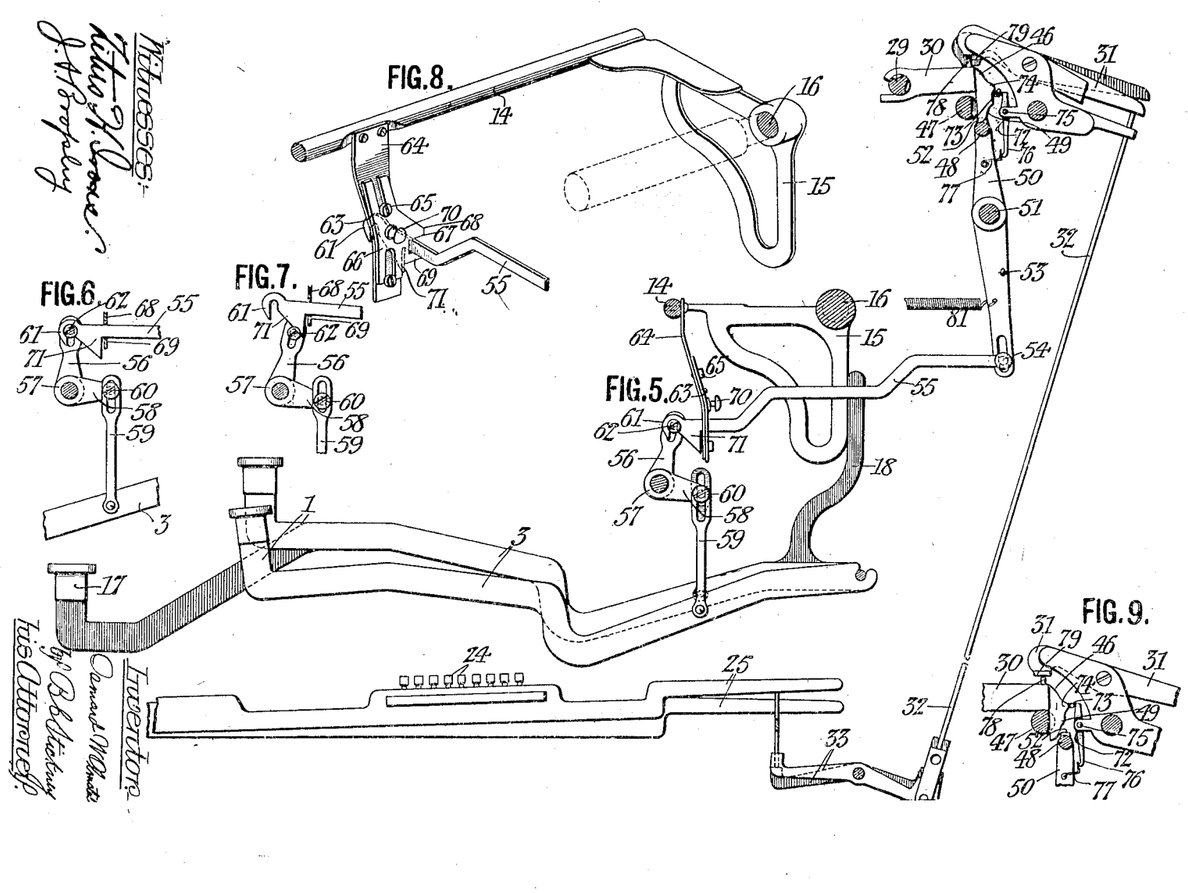
Fig. 5 is a skeleton view in vertical section, showing the relative positions of the actuated parts when one of the numeral keys is depressed to raise the tappet and thus indirectly raise one of the pin bars.
Fig. 6 is a fragmentary view in section, showing the connection between the numeral keys and shifter for raising the tappet in its joined or completed condition, so that when the key is actuated the column selecting and computing wheel selecting mechanism will be actuated.
Fig. 7 is a view of the same parts shown in Fig. 6, showing the connection, however, interrupted, so as to enable the numeral keys to be actuated without actuating the pin bar and column selecting mechanism.
Fig. 8 is a fragmentary perspective view, showing the disconnector for raising the link, whereby the connection between the numeral keys and the column selecting mechanism will be interrupted, the parts being shown in this figure with the manual means raised to effect the disconnection.
Fig. 9 is a fragmentary vertical section, showing the tappet, the jacks and the detent in their unactuated positions.

When the link 55 is raised from the position shown in Fig. 6 to the position shown in Fig. 7, the bell crank 57 will naturally rock to the position shown in Fig. 7, and it will therefore be necessary to force it back into engagement with the slot of the hook 61 when the link 55 is again lowered. For this purpose there is provided on the link 55 a cam lug 71 which is formed with an inclined edge engaging the pin 62 and adapted to force the pin into the slot of the hook 61 when the link 55 is lowered. This therefore forms a manual and automatic means for connecting and disconnecting the link 55 from the universal bell crank 57, so that if desired the computing mechanism can be rendered ineffective by operatively disconnecting the numeral keys from the column selecting mechanism at this point.

It has been described how the tappet 30 is actuated by any one of the numeral keys to raise one of the jacks 31. When, however, the tappet 30 is in register with one of the jacks 34, which correspond to the comma and period columns of the number being written on the work-sheet, it is desirable that the numeral keys be locked so as to indicate that a comma or period key should be depressed. Since the numeral keys cannot by their direct action cause the corresponding jack 34 to be actuated, other means must be provided to cause a positioning of the key-locking devices under control of one of the jacks 34. To accomplish this there is provided a selecting detent or retainer 72 which has enlargements or ears 73 located so as to engage a shoulder 74 on the lug 46 of the tappet 30 and hold it in its raised position after it has been raised in the denominational column preceding the letter space column of a comma or period.

The selecting detent 72 is shown in the form of a pivotally mounted pawl with the enlargements or ears formed on the cross bar 75 thereof, and with one arm 76 of the pawl extended so as to engage a spring 77 on each one of the arms 50 of the universal shifter. By this means, when the shifter tends to return after the pressure on the numeral key has been released, the spring 77 will engage the arm 76, holding the ear 73 tightly under the shoulder 74, and also preventing the complete return of the universal bar 48 from beneath the tappet 30. When the carriage, however, after the removal of the pressure on the comma or period key, which must be struck at this time, moves forward, it will carry the tappet 30 so that the shoulder thereon will slip off from the end of the ear 73, permitting the tappet 30 to fall out of engagement with the jacks. In order that the tappet 30 may cam against the jacks 31 and 34, it may be provided with a cam tooth 78 which will coöperate successively with oppositely faced cam teeth 79 on the jacks 31 and 34. The cam tooth 78 may be pivotally mounted and held in its raised position by a spring 80, so that in case it should be accidentally held in its raised position, it will automatically slip by the teeth 79 during the return motion of the carriage without raising the jacks. The connection, however, of this tooth 78 is such that during the letter feeding movement of the carriage it will be positively held against backward movement so that it will positively lift the jacks 31 and 34 when the tappet 30 is raised to its upper position. The connection between the numeral keys and the tappet 30 is aided in its return to normal position, after the pressure on the numeral keys has been removed, by a spring 81 which is connected to the arm 53 of the shifter and to a convenient member 82 on the frame.

Figure 10:
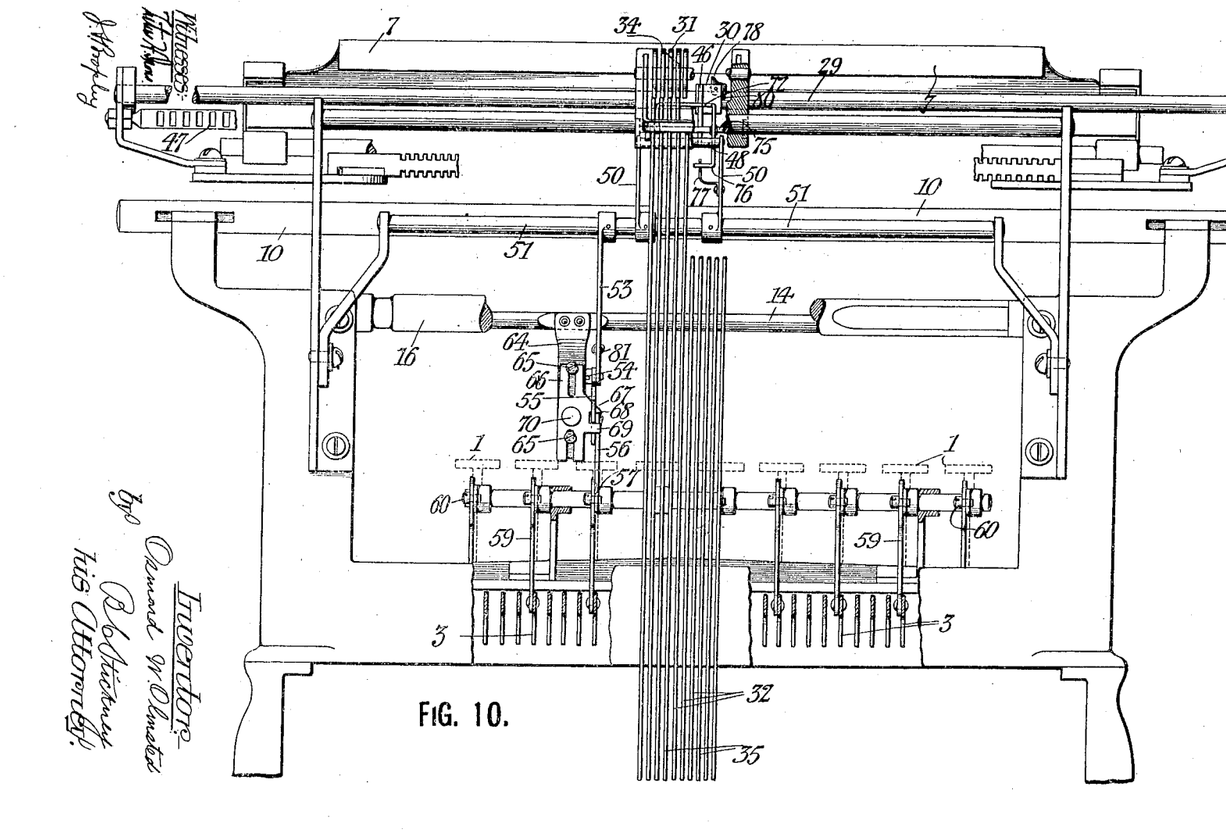
Fig. 10 is a rear view in elevation with parts broken away and showing the linkage between the numeral keys and the column selecting mechanism in its operative condition.

In the operation of the device it will be seen that when none of the numeral keys are in their actuated position that all of the actuable elements of the typewriting mechanism are out of contact and disconnected from all of the actuable elements of the computing mechanism so that so long as no numeral key is actuated, the carriage can move back and forth and the other keys actuated without disturbing or interference from the actuable elements of the computing mechanism. If, however, in the ordinary operation of computing the carriage has been shifted in one way or another to a position such that its printing point is in the zone of printing the numerals to be computed, then the tappet 30, if the computing is carried on at this instant with one computing head alone, will, if previously correctly adjusted relative to the carriage, come in register with one of the jacks 31 at the right of the set corresponding to this particular computing head. The tappet 30 will, however, not be in actual contact with the jack 31, but merely in a position to come in contact therewith. If the platen frame 11 is in its lower position corresponding to the writing of numerals with the numeral keys 1, and further, if the shifting guide 66 is in its lower position, as shown in Fig. 10, then when one of the numeral keys "1" to "9" is struck, the tappet 30 will be raised through the connecting linkage embodying one of the links 59, the bell crank 57, the hook 55 and the shifter engaging, by its shifting bar 48, with the cam surface 46, so as to raise the front end of the apposite jack 31. This jack 31 will in turn, through the connecting mechanism, raise the associated bar 25 above its fellows, so that the pin 24 thereon, corresponding to the particular numeral key struck, will be depressed below its fellows, so as to determine the extent of subsequent movement of the bar 25 to carry up the numeral struck on the accordant computing wheel 26 in the usual manner.

When the pressure on the particular numeral key 1 actuated is removed, the parts will be returned to their normal position by the spring 81, permitting the tappet 30 to fall out of engagement with the actuated jack 31, so that the corresponding bar 25 can fall to its depressed position. The exception to this occurs, however, when the jack just raised is located before one of the jacks 34 corresponding to a comma or period. In such a case, one of the ears 73 will be engaged by the shoulder 74 so that the tappet 30 will be held in its raised position both by the detent 72 and by the universal bar 48, whereby the comma or period jack, on the movement of the carriage, which takes place on the removal of pressure from the actuated key, will be cammed up by the tooth 78 engaging the tooth 79 of the comma or period jack. When this occurs, all of the numeral keys are locked against actuation, so that either a comma or period will be struck, thus bringing the carriage to the next denominational column when the tappet 30 will have cleared the ear 73 which held it in its raised position so that it is free to fall and permit the mechanism to return to its normal position.

If one of the shift keys 17 should be actuated so as to raise the platen to an upper case writing position, then the link 55 will be raised by the disconnector 63 so as to lift the hook 61 out of engagement with the pin 62, thereby interrupting the connection between the numeral keys and the column selecting mechanism. In this condition of affairs, the numeral keys can be freely struck without lifting the tappet 30 to operate the jacks 31 and the connected mechanism. At other times when it is desired to do some typewriting work which may involve the use of the numeral keys without computing, it is merely necessary to force up the guide 66 by means of a knob 70 so as to manually raise the link 55 out of connection with the bell crank 57. This also renders the control of the computing wheel selected by the typewriting mechanism ineffective.

Variations may be resorted to within the scope of the invention, and portions of the improvements may be used without others.

Having thus described my invention, I claim:

1. The combination with a typewriting mechanism including numeral keys and a typewriter carriage, of a series of computing wheels, mechanism for selecting a particular one of said computing wheels to run up or accumulate a number corresponding to that of a particular actuated numeral key, passive means mounted on and carried by the carriage for determining the selection of any particular computing wheel, and numeral key actuated means for positively moving said passive means to complete the selection.

2. The combination with a typewriting mechanism including numeral keys and a typewriter carriage, of a series of computing wheels, mechanism for selecting a particular one of said computing wheels to run up or accumulate a number corresponding to that of a particular actuated numeral key, passive means mounted on and carried by the carriage for determining the selection of any particular computing wheel, and means independent of the carriage for operating said passive means.

3. The combination with a typewriting mechanism including numeral keys, of a series of computing wheels, mechanism for selecting a particular one of said wheels to run up or accumulate a number corresponding to that of a particular numeral key actuated, means ineffective in itself to affect said selecting mechanism, operating to indicate a particular selection, connections between said numeral keys and said means whereby the force utilized to depress said keys will also act through the intermediary of said means to actuate said selecting mechanism, manually operable means for interrupting said connections to render the same ineffective at any point in the computing zone, and means for restoring said connections.

4. The combination with a plurality of numeral keys, of a plurality of computing wheels, a series of pin bars, one individual to each computing wheel, connections between said numeral keys and said pin bars, whereby said keys when struck will position said bars individually from their fellows.

5. The combination with a plurality of numeral keys, of a plurality of computing wheels, a series of pin bars, one individual to each computing wheel, and universal connections between said keys and said bars enabling any of said keys to position all of said bars *seriatim* away from their fellows.

6. The combination with typewriting mechanism including numeral keys and a carriage, of computing mechanism including computing wheels and means individual to each computing wheel for operating the same, connections for selectively manipulating each one of said individual means to a position apart from its fellows, said connections including a series of linkages, and a series of jacks, a tappet movable concomitantly with the movement of said carriage so as to come in register individually with said jacks, and numeral key operated means for manipulating said tappet to operate one of said jacks.

7. The combination with typewriting mechanism including numeral keys and a carriage, of computing mechanism including computing wheels and means individual to each computing wheel for operating the same, connections for selectively manipulating each one of said individual means to a position apart from its fellows, said connections including a series of linkages, and a series of jacks, a tappet movable concomitantly with the movement of said carriage so as to come in register individually with said jacks, numeral key operated means for manipulating said tappet to operate one of said jacks, and means for holding said tappet in its operated position at predetermined points in the travel thereof.

8. The combination with typewriting mechanism including numeral keys and a carriage, of computing mechanism including computing wheels and means individual to each computing wheel for operating the same, connections for selectively manipulating each one of said individual means to a position apart from its fellows, said connections including a series of linkages, and a series of jacks, a tappet movable concomitantly with the movement of said carriage so as to come in register individually with said jacks, numeral key operated means for manipulating said tappet to operate one of said jacks; said tappet having a shoulder thereon, and a detent arranged to hold said tappet in its operated position at certain points in the travel of said tappet.

9. The combination with a typewriting mechanism including a carriage and numeral keys, of a computing mechanism including a plurality of computing wheels and means for operating the same, mechanism for determining which of said computing wheels shall accumulate a certain number struck at a particular instant by one of said numeral keys, a tappet movable concomitantly with said carriage for determining the selection of the computing wheels, said tappet being normally ineffective, means for manipulating said tappet from an ineffective to an effective position, and means for holding said tappet in its effective position at predetermined points in its travel and enabling said tappet to move to its ineffective position at other points in its travel.

10. The combination with a typewriting mechanism including a carriage and numeral keys, of computing mechanism including a plurality of computing wheels and means for operating the same, mechanism for determining which of said computing wheels shall accumulate a certain number struck at a particular instant by one of said numeral keys, a tappet movable concomitantly with said carriage for determining the selection of the computing wheels, said tappet being normally ineffective, said tappet having a shoulder thereon, means for raising said tappet to its effective position, and a detent having a plurality of ears thereon adapted to engage said shoulder to hold said tappet in its effective position at predetermined points in the travel of said tappet.

11. The combination with a typewriting mechanism including a carriage and numeral keys, of computing mechanism including a plurality of computing wheels and means for operating the same, mechanism for determining which of said computing wheels shall accumulate a certain number struck at a particular instant by one of said numeral keys, a tappet movable concomitantly with said carriage for determining the selection of the computing wheels, said tappet being normally ineffective, said tappet having a shoulder thereon, means for raising said tappet to its effective position, and a detent having a plurality of ears thereon adapted to engage said shoulder to hold said tappet in its effective position at predetermined points in the travel of said tappet; said detent acting to hold said last-mentioned means in its operated position.

12. The combination with a typewriting mechanism, of a computing mechanism, means for selectively actuating certain parts of said computing mechanism in conjunction with said typewriting mechanism, said means including a tappet traversible in a normally ineffective position, means for rendering said tappet effective by shifting said tappet at the actuation of certain parts of said typewriting mechanism, and means for holding said tappet in its effective position irrespective of the actuation of said certain parts.

13. The combination with a typewriting mechanism, of a computing mechanism, means for selectively actuating certain parts of said computing mechanism in conjunction with the actuation of certain parts of said typewriting mechanism, said means including a tappet traversible in a normally ineffective position, linkages operable by certain parts of said typewriting mechanism to render said tappet effective, said linkages being disconnectible to render said tappet passive, manually operable means for effecting the disconnection of said linkages, and means for restoring the linkages to effective condition.

14. The combination with a typewriting mechanism including numeral keys, of computing mechanism including a series of computing wheels, means for selecting the particular computing wheel to receive a number corresponding to that of a particular numeral key struck at any instant, connections to said numeral keys for imposing on said numeral keys the actual work of moving the parts to effect a complete selection, said connections including a universal member, links connecting said universal member individually to said keys, a hook detachably connected to said universal member, and a universal shifter connected to said hook.

15. The combination with a typewriting mechanism including numeral keys, of computing mechanism including a series of computing wheels, means for selecting the particular computing wheel to receive a number corresponding to that of a particular numeral key struck at any instant, connections to said numeral keys for imposing on said numeral keys the actual work of moving the parts to effect a complete selection, said connections including a universal member, links connecting said universal member individually to said keys, a hook detachably connected to said universal member, a universal shifter connected to said hook, and means for disconnecting said hook from said universal member to render said connections ineffective.

16. The combination with a typewriting mechanism including a carriage and numeral keys, of a computing mechanism including a series of computing wheels, means for determining the particular computing wheel to run up an accumulation corresponding to a particular numeral key actuated at a certain instant, connections operated by said numeral keys for operating said means to effect a selection, said connections including a universal bell crank, links connecting said bell crank individually with said keys, a hook connected to said bell crank, and a shifter connected to said hook, each of said links having a lost motion connection with said universal bell crank, so as to enable any one of said keys to actuate said bell crank, leaving the others of said keys in their normal inactive positions.

17. The combination with a typewriting mechanism including numeral keys, of a computing mechanism, connections betwen said typewriting mechanism and said computing mechanism enabling certain parts of said computing mechanism to be operated by said numeral keys, said connections including a universal bell crank, links connected individually to said keys and connected to said bell crank so that said keys may individually operate said bell crank, a pin carried by said bell crank, a link having a hook detachably connected to said pin, and a shifter operated by said link.

18. The combination with a typewriting mechanism including numeral keys, of a computing mechanism, connections between said typewriting mechanism and said computing mechanism enabling certain parts of said computing mechanism to be operated by said numeral keys, said connections including a universal bell crank, links connected indivdually to said keys and connected to said bell crank so that said keys may individually operate said bell crank, a pin carried by said bell crank, a link having a hook detachably connected to said pin, a shifter operated by said link, and an adjustably mounted guide for said link enabling said hook to be moved to a position in engagement with said pin and also to a position clear of said pin, so as to render said connections effective or ineffective.

19. The combination with a typewriting mechanism including numeral keys, a carriage and shifting means for moving certain parts of said carriage from a lower case writing position to an upper case writing position, of computing mechanism, connections between said typewriting mechanism and said computing mechanism enabling an operation of certain parts of said computing mechanism by said typewriting mechanism, said connections including a member having connections with said numeral keys, a link movable from a position operatively connected with said member to a position disconnected from said member, and means carried by said shifting means for disconnecting said link when said shifting means is manipulated to a position corresponding to writing upper case characters.

20. The combination with a typewriting mechanism including a carriage and numeral keys, of a computing mechanism, a series of jacks, connections between said jacks and said computing mechanism, a tappet traveling concomitantly with said carriage and normally moving in an ineffective position to positions successively in register with individuals of said jacks, a universal bar for manipulating said tappet when in register with any one of said jacks, and operative connections between said universal bar and said keys, whereby said keys may actuate said bar and said tappet to manipulate said jacks; said connections being disconnectible so as to interrupt the effective actuation of said tappet by said keys.

21. The combination with a typewriting mechanism including a carriage and numeral keys, of a computing mechanism, a series of jacks, connections between said jacks and said computing mechanism, a tappet traveling concomitantly with said carriage and normally moving in an ineffective position to positions successively in register with individuals of said jacks, a universal bar for manipulating said tappet when in register with any one of said jacks, operative connections between said universal bar and said keys, whereby said keys may actuate said bar and said tappet to manipulate said jacks; said connections being disconnectible so as to interrupt the effective actuation of said tappet by said keys, and means effected by the actuation of a certain part of said typewriting mechanism other than said numeral keys to effect said disconnection.

22. The combination with a typewriting mechanism including numeral keys, of a computing mechanism, a series of jacks, connections between said jacks and certain parts of said computing mechanism, a tappet movable into register with each of said jacks, a universal bar arranged so as to be capable of operating said tappet to manipulate any one of said jacks when said tappet is in registry with any one of said jacks, means for according and operating said universal bar, a link connected to said last mentioned means, said link having a hook thereon, a bell crank engaged by said hook, and connections between said bell crank and said numeral keys.

23. The combination with a typewriting mechanism including numeral keys, of a computing mechanism, a series of jacks, connections between said jacks and certain parts of said computing mechanism, a tappet movable in register with each of said jacks, a universal bar arranged so as to be capable of operating said tappet to manipulate any one of said jacks when said tappet is in register with any one of said jacks, means for according and operating said universal bar, a link connected to said last mentioned means, said link having a hook thereon, a bell crank engaged by said hook, and connections between said bell crank and said numeral keys; said connections having lost motion or play so that said universal bar will be operated by any of said keys while the others of said keys remain in their normal unactuated position.

24. The combination with a typewriting mechanism, of a computing mechanism, a series of jacks, connections between said jacks and certain parts of said computing mechanism, a tappet movable into register with each of said jacks, a shifter universal to all of said jacks so as to come in operative engagement with said tappet when said tappet is in register with any of said jacks, means for operating said universal shifter, and a detent coöperating with said tappet and said shifter to hold them in their actuated position when said tappet coöperates with a certain one of said jacks.

25. The combination with a typewriting mechanism including numeral keys, of a computing mechanism including computing wheels and bars connected to said computing wheels, links connected to said keys, a bell crank universal to said links, a hook link connected to said bell crank, a shifter operated by said hook link, a tappet operable by said shifter, a series of jacks, any one of which is operable by said tappet, and linkages individual to each of said jacks and accordant ones of said bars so that said bars may be manipulated by said jacks.

26. The combination with a typewriting mechanism including a carriage, a platen frame on said carriage, a shift rail for said platen frame, and numeral keys, of a computing mechanism, links connected to said keys, a bell crank connected to said numeral keys, a hook link detachably connected to said bell crank, connections between said hook link and said computing mechanism, whereby said numeral keys may actuate certain parts of said computing mechanism, a guide for said hook link, and means supporting said guide from said shift rail, whereby when said shift rail is raised to move said platen frame to a position corresponding to the writing of upper case characters by said typewriting mechanism said hook link will be disconnected from said bell crank to interrupt the operation of certain parts of said computing mechanism by said numeral keys.

27. The combination with a typewriting mechanism including a carriage, a platen frame on said carriage, a shift rail for said platen frame, and numeral keys, of a computing mechanism, links connected to said keys, a bell crank connected to said numeral keys, a hook link detachably connected to said bell crank, connections between said hook link and said computing mechanism, whereby said numeral keys may actuate certain parts of said computing mechanism, a guide for said hook link, and means supporting said guide from said shift rail, whereby when said shift rail is raised to move said platen frame to a position corresponding to the writing of upper case characters by said typewriting mechanism, said hook link will be disconnected from said bell crank to interrupt the operation of certain parts of said computing mechanism by said numeral keys; said hook link having a cam surface acting to effect a connection of said hook link with said bell crank when said shift rail is lowered to write lower case characters.

28. The combination with a typewriting mechanism including a carriage, a platen frame carried by said carriage, a shift frame for manipulating said platen frame so as to write upper and lower case characters, and numeral keys, of a computing mechanism, connections between said numeral keys and said computing mechanism including a series of links individual to said numeral keys, a bell crank connected to said links, a hook link connected to said bell crank, a guide for said hook link, and a plate connected to said shift frame and supporting said guide, said hook link being detachable from said bell crank by the movement of said shift frame.

29. The combination with a typewriting mechanism including a carriage, a platen frame carried by said carriage, a shift frame for manipulating said platen frame so as to write upper and lower case characters, and numeral keys, of a computing mechanism, connections between said numeral keys and said computing mechanism including a series of links individual to said numeral keys, a bell crank connected to said links, a hook link connected to said bell crank, a guide for said hook link, and a plate connected to said shift frame and supporting said guide, said hook link being detachable from said bell crank by the movement of said shift frame; said guide being adjustably mounted on said plate so as to enable a disconnection of said hook link from said bell crank irrespective of the position of said shift frame.

30. The combination with a typewriting mechanism including a plurality of numeral keys, of a computing mechanism, connections between certain parts of said computing mechanism and said numeral keys including links individual to said numeral keys, a bell crank, said links and said bell crank having a pin-and-slot connection, said bell crank having an arm with a slot therein, a pin adjustably mounted in said slot, and a link having a hook detachably connected to said pin.

31. The combination with a typewriting mechanism including a plurality of numeral keys, of a computing mechanism, connections between certain parts of said computing mechanism and said numeral keys including links individual to said numeral keys, a bell crank, said links and said bell crank having a pin-and-slot connection, said bell crank having an arm with a slot therein, a pin adjustably mounted in said slot, and a link having a hook detachably connected to said pin, and means for disengaging said hook from said pin, said link having a cam surface thereon adapted to engage said pin to shift said pin into engagement with said hook on the movement of said link to its connecting position with said bell crank.

32. The combination with typewriting mechanism including numeral keys and means for enabling the change between upper and lower case characters, of a computing mechanism including a series of computing wheels and a corresponding series of indexing members, trains of mechanical connections between said numeral keys and said indexing members enabling both the selection and setting by said numeral keys of the particular indexing members preparatory to the accumulation on said wheels of numbers corresponding to the particular numeral keys actuated, a single member constituting a link in said connections, and means operated by said case-changing means for interrupting the connection between said numeral keys and said indexing members, and acting on said single member so as to prevent the selection and setting by said numeral keys of the particular indexing members to be actuated while said case-changing means is moved for writing upper case characters.

33. The combination with typewriting mechanism including numeral keys and means for enabling the change between upper and lower case characters, of a computing mechanism including a series of computing wheels and a corresponding series of indexing members, trains of mechanical connections between said numeral keys and said indexing members enabling both the selection and setting by said numeral keys of the particular indexing members preparatory to the accumulation on said wheels of numbers corresponding to the particular numeral keys actuated, a single member constituting a link in said connections, means operated by said case-changing means for interrupting the connection between said numeral keys and said indexing members, and acting on said single member so as to prevent the selection and setting by said numeral keys of the particular indexing members to be actuated while said case-changing means is moved for writing upper case characters, and manual means other than said case-changing means also acting on said single member for rendering said mechanical connections ineffective.

34. The combination with a traveling typewriter carriage, of a series of numeral keys, a computing mechanism including a series of computing wheels, said carriage and said computing mechanism being normally disconnected, an element passively mounted on and carried by said carriage to determine a selection of the particular computing wheel to receive the number corresponding to the numeral key actuated at any instant, and means other than said carriage for performing the actual work of manipulating said element to bring about an active effective movement to adjust said computing mechanism and thereby select a computing wheel corresponding to the denominational column of the carriage in position to be printed on.

35. The combination with a traveling typewriter carriage, of a series of numeral keys, a computing mechanism including a series of computing wheels, said carriage and said computing mechanism being normally disconnected, an element passively mounted on and carried by said carriage to determine a selection of the particular computing wheel to receive the number corresponding to the numeral key actuated at any instant, means other than said carriage for performing the actual work of manipulating said element to bring about an active effective movement to adjust said computing mechanism and thereby select a computing wheel corresponding to the denominational column of the carriage in position to be printed on, and means for rendering said last-mentioned means inoperative.

36. The combination with a traveling carriage, of a series of numeral keys, a computing mechanism including a series of computing wheels, said carriage and said computing mechanism being normally disconnected, an element passively carried by said carriage to determine a selection of the particular computing wheel to receive the number corresponding to a numeral key actuated at any instant, means other than said carriage for performing the actual work of manipulating said element to bring about an active effective movement to adjust said computing mechanism and thereby select a computing wheel corresponding to the denominational column of the carriage in position to be printed on, and means to call on said carriage to do the work of manipulating said element solely at points other than where numeral keys are actuated.

37. The combination with a carriage, of a series of numeral keys, a computing mechanism including a series of computing wheels, an element carried passively by said carriage to determine the selection of computing wheels to receive numbers corresponding to the actuation of particular numeral keys at any instant, said carriage having a traveling movement relative to said computing mechanism to determine computing zones, means other than said carriage for performing the actual work of manipulating said element to bring about an active effective selecting movement of the computing zone to receive a computation, and means for calling on said carriage to do the work of manipulating said element solely, at passive points in the computing zone, where no computing is to be carried on.

38. The combination with a series of numeral keys, of a series of computing wheels, a series of column-selecting members to determine the computing wheels to be actuated, a series of digit-selecting members to determine the extent of actuation of the computing wheels, and numeral-key-actuated means for simultaneously causing a single digit-selecting member and a single column-selecting member to approach each other at the actuation of any numeral key to effect a cross selection by coöperating with each other, and thus determine the particular computing wheel to be actuated and the extent of its actuation.

39. The combination with a traveling carriage, of a computing mechanism, a tappet carried by said carriage for controlling said computing mechanism, said tappet being normally in an ineffective position, and automatic means for maintaining it in an effective position at certain points in the travel of said carriage.

40. The combination with a traveling carriage, of a computing mechanism, a tappet carried by said carriage for controlling said computing mechanism, and automatic means for controlling the effective and ineffective positions of said tappet during the travel of said carriage.

41. The combination with a traveling carriage, of a computing mechanism, a tappet carried by said carriage for controlling said computing mechanism, and automatic means for controlling the effective and ineffective positions of said carriage during the travel of said carriage, so as to control computing and non-computing points in the travel of said carriage.

42. The combination with a traveling carriage, of a computing mechanism, a tappet carried by said carriage for controlling said computing mechanism, and automatic means for controlling the effective and ineffective positions of said tappet during the travel of said carriage, so as to govern the distinction between computing digit columns and non-computing comma or decimal-point columns.

43. The combination with a traveling typewriter carriage, of a computing mechanism, a series of jacks controlling the action of said computing mechanism, a tappet mounted on and carried by said carriage *seriatim* into spaced register with said jacks and actuating means for said tappet other than said carriage enabling said tappet to actuate said jacks.

44. The combination with a traveling carriage, of a computing mechanism, a series of jacks controlling the action of said computing mechanism, a tappet carried by said carriage *seriatim* into spaced register with said jacks, actuating means for said tappet other than said carriage enabling said tappet to actuate said jacks, and locking means for maintaining said tappet in its effective position at certain points in the travel of said carriage.

45. The combination with a carriage, of a series of numeral keys, a computing mechanism including a series of computing wheels, a direct train of connection between said numeral keys and said computing mechanism actuated by said numeral keys to control the particular computing wheel to receive a number corresponding to the numeral key actuated, and carriage-controlled means for interrupting said train of connection.

46. The combination with a carriage, of a series of numeral keys, a computing mechanism including a series of computing wheels, and a direct train of connection between said numeral keys and said computing mechanism actuated by said numeral keys to control the particular computing wheel to receive a number corresponding to the numeral key actuated, one of the elements in said train being mounted on said carriage to travel therewith and determine computing and non-computing zones.

47. The combination with a carriage, of a series of numeral keys, a computing mechanism including a series of computing wheels, and a direct train of connection between said numeral keys and said computing mechanism actuated by said numeral keys to control the particular computing wheel to receive a number corresponding to the numeral key actuated, said train having a series of distinct linkages extending to said computing mechanism and also having an element connected to be universally operated by said numeral keys and carried by said carriage *seriatim* into register with the several distinct linkages.

48. The combination with a carriage, of a series of numeral keys, a computing mechanism including a series of computing wheels, a direct train of connection between said numeral keys and said computing mechanism actuated by said numeral keys to control the particular wheel to receive a number corresponding to the numeral key actuated, carriage-controlled means for interrupting said train of connection and letter-case controlling means for determining the effectiveness of said train of connection.

49. The combination with a carriage, of a series of numeral keys, a computing mechanism including a series of computing wheels, a direct train of connection between said numeral keys and said computing mechanism actuated by said numeral keys to control the particular wheel to receive a number corresponding to the numeral key actuated, carriage-controlled means for interrupting said train of connection, letter-case controlling means for determining the effectiveness of said train of connection, and manual controlling means for governing the effectiveness of said train of connection.

50. The combination with a carriage, of a series of numeral keys, a computing mechanism including a series of computing wheels, a direct train of connection between said numeral keys and said computing mechanism actuated by said numeral keys to control the particular computing wheel to receive a number corresponding to the numeral key actuated, carriage-controlled means for interrupting said train of connection, and manual controlling means for determining at will the effective and ineffective states of said train of connection.

51. The combination with a typewriting mechanism including a traveling carriage and a series of numeral keys, of computing mechanism including a series of denominational members, a tappet carried by said carriage, a series of jacks connected individually to said denominational members, said tappet being carried step by step with said carriage into spaced register *seriatim* with each of said jacks, means for enabling said numeral keys to shift said tappet to actuate the jack in register therewith, and means to enable said carriage to perform the work of shifting a jack at intervals in the absence of shifting by said numeral keys, said tappet and said jacks having coöperating camming surfaces to enable such shifting of said jacks by said tappet.

52. The combination with a typewriting mechanism including a traveling carriage and a series of numeral keys, of computing mechanism including a series of denominational members, a series of jacks to operate said denominational members, a tappet carried by said carriage into spaced register with each of said jacks, a cam on each of said jacks, a cam on said tappet, and operative connections enabling any of said numeral keys to actuate said tappet so as to bring the cam thereon into operative contact with the cam on said jack registering therewith so as to actuate such jack.

53. The combination with a typewriting mechanism including a traveling carriage and a series of numeral keys, of a computing mechanism controlled in its action by said numeral keys, and including a series of denominational members, a series of jacks individual to said denominational members and connected to operate the same, a tappet carried by said carriage step by step into register with each of said jacks, said jacks corresponding to the denominational order of the digits of a number to be computed, jacks interspersed among said first-named jacks corresponding to the decimal point and commas between the digits of the number being computed, a tappet carried by said carriage, arranged to come into register *seriatim* with each of said jacks, connections enabling said numeral keys to actuate said tappet when in register with jacks corresponding to the digits of the number being computed, and means for calling on said carriage to perform the work of actuating jacks at points corresponding to the decimal point and commas between the digits of the number being computed.

54. A combined typewriting and computing machine having a traveling carriage, a series of computing wheels, a series of numeral keys, a series of rack bars for operating the computing wheels, and a series of indexing devices on said bars for governing the extent of movement thereof; and comprising in combination, a denominational selecting mechanism including a series of jacks connected individually to said rack bars to control the setting of the indexing devices, a tappet carried by said carriage into register with each of said jacks *seriatim*, and operative connections enabling the actuation of said tappet by any of said numeral keys, so as to operate the jack in register with said tappet at the instant of actuation of the numeral key.

55. A combined typewriting and computing machine having a traveling carriage, a series of computing wheels, a series of numeral keys for controlling the extent of rotation of said computing wheels and a step-by-step movement of said carriage, a series of rack bars for operating the computing wheels as determined by said keys, one rack bar individual to each of said wheels, and a series of indexing devices arranged in a row, one row for each of said rack bars; and comprising in combination, denominational selecting mechanism for said indexing devices including setting mechanism for said indexing devices operable by said keys, said indexing devices being normally beyond the sphere of action of said setting mechanism, a series of jacks connected individually to individuals of said rack bars, a tappet carried by said carriage successively into register with each of said jacks, and operative connections enabling said keys, at the actuation of any one thereof, to actuate the accordant setting mechanism to operate said tappet, so as to actuate the registering jack to bring the row of indexing pins on the accordant rack bar into the sphere of operation of said setting mechanism.

56. The combination with a series of computing wheels, of a series of rack bars, one engaging each of said computing wheels to drive the same, a series of indexing devices on each of said rack bars settable to determine the extent of movement thereof, a series of numeral keys for setting said devices, a member traveling successively to positions capable of actuating said rack bars to enable the setting of said indexing devices thereon by said numeral keys, and connections operated by any of said numeral keys at the actuation thereof, to shift said member and thereby bring the rack bar in register with said member to a position enabling the setting of the indexing devices thereon, corresponding with the numeral key actuated.

57. The combination with a series of computing wheels, of a series of rack bars connected to rotate said computing wheels, a series of indexing devices on each of said rack bars, settable to determine the extent of movement, setting mechanism comprising a series of individual linkages each corresponding to a definite value, a series of numeral keys connected to operate the setting linkages of their corresponding values, a member traveling step by step into positions capable of actuating each of said rack bars to bring the indexing devices thereon within the sphere of action of said setting linkages, and operative connections from said numeral keys to said member for operating said member to shift the rack bar in register therewith, to bring about a concomitant action of the pin-setting linkage corresponding with the value of the numeral key struck and the rack bar in register with said member, so that the indexing device on such rack bar corresponding with the value of the key struck can be set to determine the extent of movement of such rack bar and the corresponding computing wheel.

58. The combination with a series of computing wheels, of a series of denominational members on said computing wheels, a traveling typewriter carriage having step-by-step movement for the length of a written line, a series of numeral keys controlling the movement of said carriage, a series of jacks connected to said denominational members, and corresponding in their sphere of influence to a computing zone comprising a number of digit columns, a tappet mounted on and moving with said carriage for the full length of travel thereof, arranged to come *seriatim* into spaced register with each of said jacks, so as to be capable of actuating the same, a member having a sphere of influence corresponding to that of each of said jacks and to that of the computing zone, for actuating said tappet to actuate one of said jacks, and operative connections enabling any numeral key at the striking thereof, to actuate said member to shift said tappet so as to operate the jack in register therewith.

59. The combination with a series of computing wheels, of a series of denominational members for controlling the actuation of said computing wheels, a traveling carriage, a series of numeral keys for controlling the movements of said carriage and the extent of movement of said denominational members, a series of jacks arranged in juxtaposition to said carriage and connected to control said denominational members individually, at least one tappet carried by said carriage and moving with said carriage and arranged to come into register successively with each of said jacks, a member for operating said tappet to actuate the jack in register therewith when in a computing zone, said jacks and said member both having a range limited to a computing zone or column, and connections enabling any of said numeral keys to actuate said member so as to operate said tappet.

60. The combination with a series of computing wheels, of a series of denominational members for controlling the rotation of said computing wheels, a series of jacks individually arranged to control the operation of individuals of said denominational members, a series of transposition linkages, one individual to each of said jacks and each of said denominational members, a tappet arranged to operate said jacks *seriatim*, said linkages transmitting the operation of said jacks in an inverse order to said denominational members, and a series of numeral keys connected to vibrate said tappet so as to actuate said jacks.

61. The combination with a typewriting mechanism including a traveling typewriter carriage and a series of numeral keys, of a series of computing wheels, and selecting means operative solely at the actuation of any of said numeral keys to determine which of said computing wheels shall be rotated an amount corresponding to the value of the numeral key actuated, said selecting means including a series of members arranged in juxtaposition to said carriage, a member carried by said carriage *seriatim* into spaced register with each of said first-mentioned members, and means actuated by any of said numeral keys for bringing about an engagement between said last-mentioned member and the individual of said series of first-mentioned members with which it happens to be in spaced register at the instant of actuation of a numeral key.

62. The combination with a typewriting mechanism, having a carriage, of computing mechanism including a series of dial wheels, a bar for each wheel, a dog movable concomitantly with said carriage, a series of jacks operable by said dog, linkages operated by said jacks for enabling the operation of said bars, and means for moving said bars normally disconnected from said bars and connectible therewith through said linkages.

63. The combination with a typewriting mechanism having a carriage and numeral keys, of computing mechanism having dial wheels and bars for operating said dial wheels, jacks connectible to said bars individually, a dog carried by said carriage and normally in position to contact with said jacks when in register therewith, for determining which of said bars shall be actuated, and connections whereby said numeral keys when actuated, will move away from its fellows the bar determined.

64. The combination with a series of numeral keys, of a series of computing wheels, a series of rack bars, one individual to each of said computing wheels, mechanism universally operable from said numeral keys, a series of interponents corresponding to said series of rack bars for actuating the same and normally in an ineffective position, said interponents being operable from said universal mechanism so as to be shifted by any of said numeral keys, a carriage, and carriage-controlled means for rendering said interponents effective to transmit a movement from an actuated numeral key to effect a movement of one of said rack bars.

65. The combination with a series of numeral keys, a series of computing wheels, a series of rack bars for actuating said computing wheels, a series of interponents, one individual to each of said rack bars for shifting the same, a member universal to said numeral keys and universal to said interponents, any one of said numeral keys being capable of actuating said universal member at any time, said universal member being normally incapable of actuating any of said interponents, and shifting means for bringing about a relative coöperative movement between said universal member and said interponents to control the effectiveness of said universal member and thus said numeral keys to actuate said interponents.

66. The combination with numeral keys and a traveling carriage, of a series of jacks to which the keys are universal through said carriage, a series of pin bars, linkages universal to the pins on the bars, and a key-operated bar universal to the pin bars.

67. The combination with a carriage, a denomination selector, and a series of numeral keys, of a computing mechanism including jacks on which said selector is effective, a series of computing wheels and actuating mechanism for said computing wheels, a pin bar for each wheel forming part of said actuating mechanism, a direct train of connections between said numeral keys and said computing mechanism actuated by said numeral keys to control the particular wheel to receive a number corresponding to the numeral key actuated, means supporting said pin bars beyond the control of said keys, whereby said train of connections is normally interrupted at said wheel actuating mechanism, and means whereby each numeral key lifts its pin bar clear of its normal support and simultaneously depresses its pin thereon against the support of the key.

68. The combination with numeral keys and pins settable thereby, of bars on which said pins are settable, a carriage for selecting said bars, an interponent for each bar for so selecting the bar, and means operated by the numeral keys for moving any bar by said interponent to move its pin to position where the key will be effective on it.

69. The combination with a series of bars, each having a series of settable devices thereon, of a series of keys for setting said devices, a universal bar operated by said keys, a series of members operable by said numeral keys for moving said first-named bars to enable the keys to set said devices, jacks for selecting said members, and a traveling carriage normally effective on said members for determining on which bar said keys may be so effective.

70. In a combined typewriting and computing machine, the combination with typewriting mechanism including numeral printing keys and a carriage, of computing mechanism including means operated by said keys, a device carried by said carriage and during the movement of said carriage entirely free from all of said computing mechanism, means whereby said keys operate said device when said carriage is in the computing zone, and denominational elements operated by said numeral keys through the medium of said device.

71. In a combined typewriting and computing machine, the combination with the numeral printing keys and the carriage of a typewriter, of a device carried by said carriage, said device during the motion of said carriage being entirely free of other parts of said computing mechanism, and denominational elements operated by said keys through the medium of an operation of said device on the carriage.

OSMOND W. OLMSTED.

Witnesses:
   H. Hanson,
   George H. Varney.

Copies of this patent may be obtained for five cents each, by addressing the "Commissioner of Patents, Washington, D. C."